(12) United States Patent
Kuroda et al.

(10) Patent No.: US 8,259,603 B2
(45) Date of Patent: Sep. 4, 2012

(54) CELLULAR SYSTEM, COMMUNICATION PATH QUALITY MEASURING METHOD, BASE STATION, AND MOBILE STATION

(75) Inventors: Nahoko Kuroda, Tokyo (JP); Takahiro Nobukiyo, Tokyo (JP)

(73) Assignee: NEC Corporation, Tokyo (JP)

( * ) Notice: Subject to any disclaimer, the term of this patent is extended or adjusted under 35 U.S.C. 154(b) by 540 days.

(21) Appl. No.: 12/443,604

(22) PCT Filed: Nov. 30, 2007

(86) PCT No.: PCT/JP2007/073145
§ 371 (c)(1),
(2), (4) Date: Mar. 30, 2009

(87) PCT Pub. No.: WO2008/069117
PCT Pub. Date: Jun. 12, 2008

(65) Prior Publication Data
US 2010/0103828 A1    Apr. 29, 2010

(30) Foreign Application Priority Data
Dec. 5, 2006    (JP) ................................ 2006-327811

(51) Int. Cl.
*H04W 4/00* (2009.01)
(52) U.S. Cl. .................... 370/252; 370/491; 370/500
(58) Field of Classification Search .................. None
See application file for complete search history.

(56) References Cited

U.S. PATENT DOCUMENTS

| | | | | |
|---|---|---|---|---|
| 6,034,952 A * | 3/2000 | Dohi et al. | ..................... | 370/335 |
| 6,618,427 B1 * | 9/2003 | Yasaki | ........................ | 375/130 |
| 7,133,688 B2 * | 11/2006 | Das et al. | ....................... | 455/522 |
| 7,428,264 B2 * | 9/2008 | Yano et al. | ..................... | 375/225 |
| 7,869,421 B2 * | 1/2011 | Rangan et al. | ................. | 370/350 |
| 2002/0159514 A1 * | 10/2002 | Miyoshi et al. | ................ | 375/226 |
| 2002/0196758 A1 * | 12/2002 | Shoji et al. | ..................... | 370/337 |
| 2006/0067446 A1 * | 3/2006 | Maeda et al. | ................. | 375/349 |
| 2007/0253450 A1 | 11/2007 | Kuroda et al. | | |
| 2008/0279259 A1 * | 11/2008 | Kobayashi et al. | ........... | 375/135 |

FOREIGN PATENT DOCUMENTS

| | | | |
|---|---|---|---|
| JP | 2000138629 A | 5/2000 | |
| JP | 2006295725 A | 10/2006 | |
| WO | 2005074155 A | 8/2005 | |
| WO | 2006016515 A1 | 2/2006 | |

OTHER PUBLICATIONS

International Search Report for PCT/JP2007/073145 mailed Jan. 29, 2008.
3rd Generation Partnership Project; Technical Specification Group Radio Access Network; Physical layer aspects for evolved Universal Terrestrial Radio Access (UTRA) (Release 7), 3GPP TR 25.814 V7.0.0, Jun. 2006, p. 1-15.
Japanese Office Action for JP2008-548254 mailed on Apr. 25, 2012.

* cited by examiner

*Primary Examiner* — Hassan Kizou
*Assistant Examiner* — Roberta A Shand (57) ABSTRACT

A cellular system comprises a mobile station and a base station. The mobile station includes a means for transmitting a pilot signal synchronized with data transmission and a means for transmitting a pilot signal not synchronized with data transmission. The base station includes a means for measuring an interference power based on the received power of the field of the pilot signal synchronized with data transmission, a means for measuring a desired wave power based on the received power of the field of the pilot signal not synchronized with data transmission, and a means for estimating the channel quality of the mobile station based on the interference power and the desired wave power.

14 Claims, 12 Drawing Sheets

CELLULAR SYSTEM, COMMUNICATION PATH QUALITY MEASURING METHOD, BASE STATION, AND MOBILE STATION

The present application is the National Phase of PCT/JP2007/073145, filed Nov. 30, 2007, which is based upon and claims the priority from Japanese Patent Application No. 2006-327811 filed on Dec. 5, 2006 and the entire of the disclosure is incorporated here.

TECHNICAL FIELD

The present invention relates to a communication system, a communication method, and a mobile station and a base station, each being used in the communication system. Particularly, the present invention relates to an improvement of the communication path quality measuring method for measuring the communication path quality of plural different up-links when an up-packet communication using a shared channel is carried out in the mobile communication system.

BACKGROUND OF THE RELATED ART

In an up-link in the E-UTRA system, which is currently standardized, in 3GPP ($3^{rd}$ Generation Partnership Project), it is now under consideration to time-multiplex pilot signals and data or control signals within a frame in unit transmission time, as described in the non-patent document 1. In the following explanation, "data" means "data or control signal" for brief description.

Figure 1:
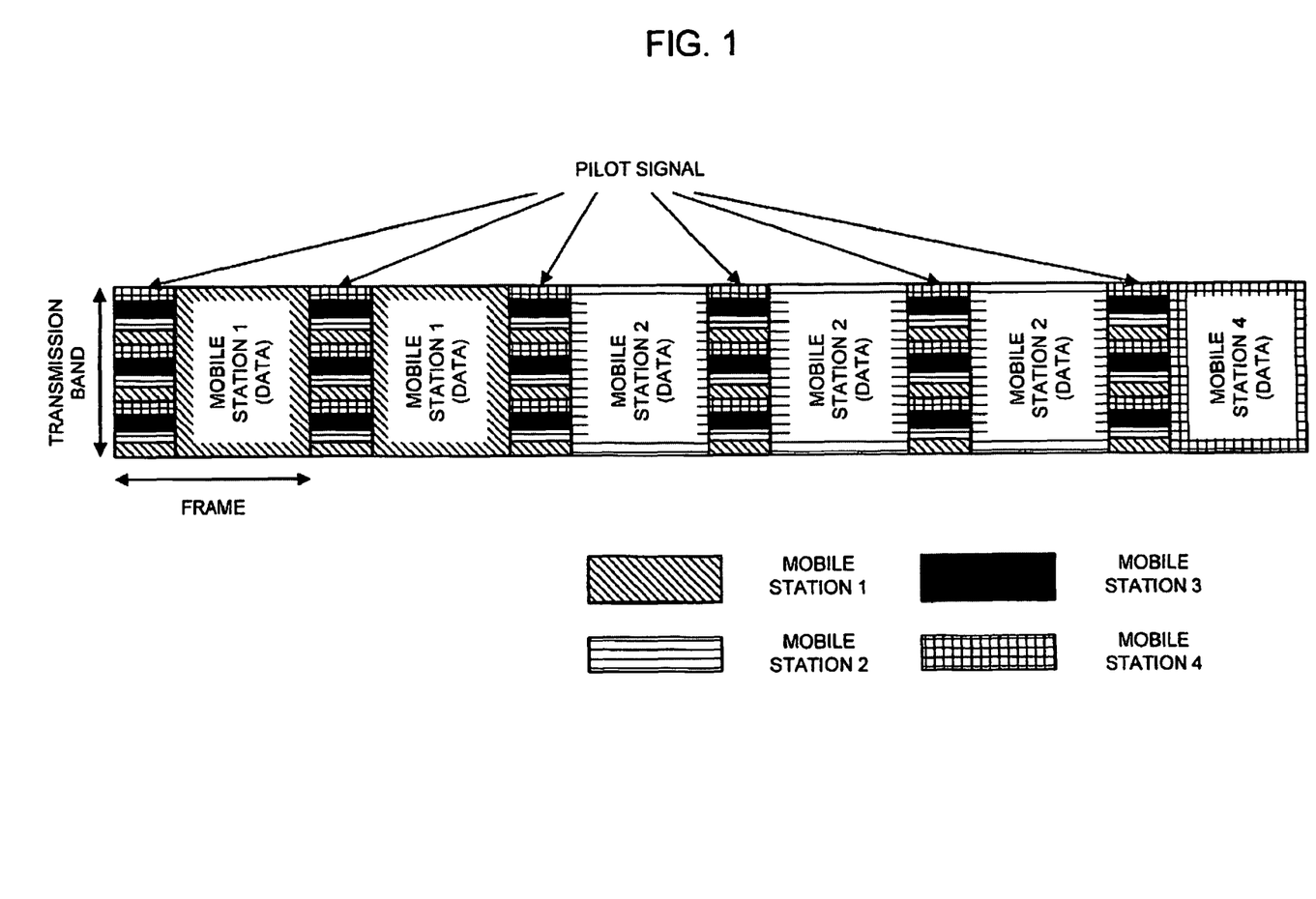
FIG. 1 is a diagram explaining a pilot signal multiplexing method in a related art.

The pilot signal is used, for example, for channel estimation necessary for data demodulation. Moreover, even when data is not transmitted, the pilot signal is used for channel quality measurement used for scheduling or adaptive modulation. In the field for a pilot signal (hereinafter referred to as a pilot field), shown roughly in FIG. 1, it has been studied to multiplex pilot signals of plural mobile stations in such that a mobile station, which does not transmit data in the frame, can transmit the pilot signal. The mobile station transmits a pilot signal according to a predetermined period and radio resource, previously specified, without depending on data transmission. By doing so, the base station can measure the quality (SIR: Signal to Interference Ratio) of the channel between the base station and mobile stations which do not transmit data. The base station uses the channel quality information to calculate scheduling index or to determine MCS (Modulation and Coding Set) in adaptive modulation.

Figure 2:
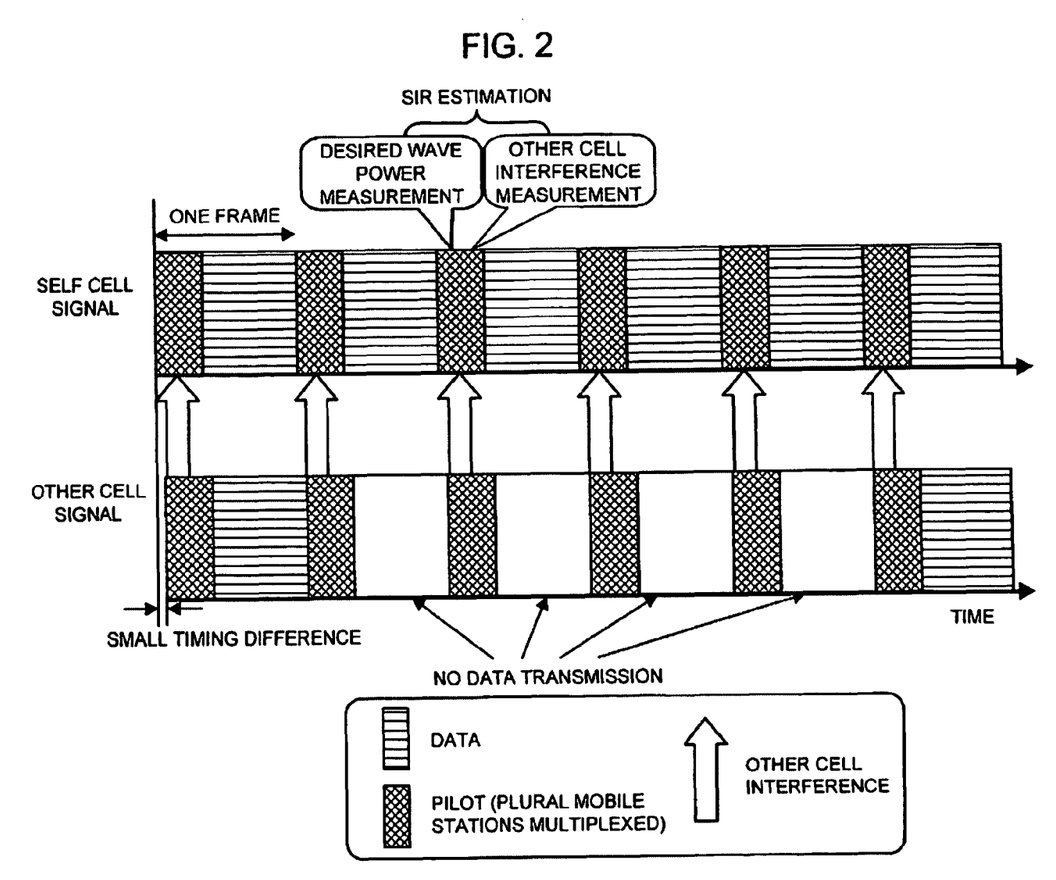
FIG. 2 is a diagram explaining a SIR measuring method in a related art.

However, the EUTRA system may synchronize the transmission timing loosely between neighboring base stations. In such a case, the base station receives the pilot signal transmitted from a mobile station within its self-cell and a pilot signal transmitted from a mobile station within other cell, with the same timing. For that reason, SIR measured with the pilot signals is measured as interference a pilot signal power transmitted from a mobile station linked to a neighboring cell (see FIG. 2).

As described above, since the pilot signal is transmitted in a predetermined period independently without depending on data transmission, an interference-by-other cell component of SIR measured in a pilot field does not match with an interference-by-other cell component received in the field for data (hereinafter referred to as data field). That is, the correlation between SIR measured in the pilot field and SIR measured in the data field becomes, small.

Non-patent document 1: TR25.814v7.0.0, $3^{rd}$ Generation Partnership Project; Technical Specification Group Radio Access Network; Physical Layer Aspects for Evolved UTRA (Release 7)

DISCLOSURE OF THE INVENTION

Problems to be Solved by the Invention

However, the problem that the radio resource cannot be used effectively arises. That is, when SIR is measured using the pilot signal under above conditions and the scheduling or adaptive modulation is conducted based on the SIR, the case occurs that a transmission rate lower than the transmittable rate is selected or that a usable channel is not used.

The present invention is made to overcome the above-mentioned problems. The object of the present invention is to provide the technique of improving the SIR estimation precision of data field and improving the performance of scheduling or adaptive modulation

Means to Solve the Problem

The present invention for solving the above-mentioned problems is a cellular system comprising: a mobile station, said mobile station including means for transmitting a pilot signal synchronized with data transmission and means for transmitting a pilot signal not synchronized with data transmission; and a base station, said base station including means for measuring an interference power based on a received power in a pilot signal field synchronized with said data transmission, means for measuring a desired wave power based on a received power in a pilot signal field not synchronized with said data transmission, and means for estimating a channel quality of said mobile station based on said interference power and based on said desired wave power.

The present invention for solving the above-mentioned problems is a cellular system comprising: a mobile station, said mobile station including means for transmitting a first pilot signal in an unit transmission time for data transmission and means for transmitting a second pilot signal, different from said first pilot signal, independently without depending on data transmission; and a base station, said base station including means measuring an interference power based on a received power in a signal field, in which said first pilot signal is transmitted, means for measuring a desired wave power based on a received power in a signal field, in which said second pilot signal is transmitted, and means for estimating a channel quality of said mobile station based on said interference power and based on said desired wave power.

The present invention for solving the above-mentioned problems is a method for measuring a communication path quality in a cellular system including plural base stations and plural mobile stations, each of said mobile stations executing the steps of transmitting a pilot signal synchronized with data transmission and transmitting a pilot signal not synchronized with data transmission; and each of said base stations executing the steps of measuring an interference power based on a received power of a pilot signal field synchronized with said data transmission, measuring a desired wave power based on a received power of a pilot signal field not synchronized with said data transmission and estimating a channel quality of each mobile station based on said interference power and based on said desired wave power.

The present invention for solving the above-mentioned problems is a method of measuring a communication path quality in a cellular system including plural base stations and said mobile stations, each of said mobile stations executing the steps of transmitting a first pilot signal in a unit transmission time for data transmission and transmitting a second pilot signal, different from said first pilot signal, independently without depending on data transmission, each of said base stations executing the steps of measuring an interference power based on a received power in a signal field in which said first pilot signal is transmitted, measuring a desired wave power based on a received power in a signal field in which said second pilot signal is transmitted, and estimating a channel quality of said mobile station based on said interference power and based on said desired wave power.

The present invention for solving the above-mentioned problems is a base station in a cellular system, said cellular system including a mobile station, said mobile station including means for transmitting a pilot signal synchronized with data transmission and means for transmitting a pilot signal not synchronized with data transmission, said base station comprising: means for measuring an interference power based on a received power in a pilot signal field synchronized with said data transmission; means for measuring a desired wave power based on a received power in a pilot signal field not synchronized with said data transmission; and means for estimating the channel quality of said mobile station based on said interference power and based on said desired wave power.

The present invention for solving the above-mentioned problems is a base station in a cellular system, said cellular system including a mobile station, said mobile station including means for transmitting a first pilot signal in a unit transmission time for data transmission and means for transmitting a second pilot signal, different from said first pilot signal, independently without depending on data transmission, said base station comprising: means for measuring an interference power based on a received power in a transmission field in which said first pilot signal is transmitted; means for measuring a desired wave power based on a received power in a signal field in which said second pilot signal is transmitted; and means for estimating the channel quality of said mobile station based on said interference power and based on said desired wave power.

The present invention for solving the above-mentioned problems is a mobile station in a cellular system, comprising: means for transmitting a pilot signal synchronized with data transmission; and means for transmitting a pilot signal not synchronized with data transmission.

The present invention for solving the above-mentioned problems is a mobile station in a cellular system, comprising: means for transmitting a first pilot signal in a unit transmission time for data transmission; and means for transmitting a second pilot signal, different from said first pilot signal, independently without depending on data transmission.

The present invention for solving the above-mentioned problems is a program for a base station in a cellular system, said cellular system including a mobile station having means for transmitting a pilot signal synchronized with data transmission and means for transmitting a pilot signal not synchronized with data transmission, said program, executed by an information processor in said base station, comprising the steps of: measuring an interference power based on a received power in a pilot signal synchronized with said data transmission; measuring a desired wave power based on a received power in a pilot signal field not synchronized with said data transmission; and estimating a channel quality of said mobile station based on said interference power and based on said desired wave power.

The present invention for solving the above-mentioned problems is a program suitable for a base station in a cellular system, said cellular system including a mobile station, said mobile station including means for transmitting a first pilot signal in a unit transmission time for data transmission and means for transmitting a second pilot signal, different from said first pilot signal, independently without depending on data transmission, said program executed by an information processor in said base station, comprising the steps of: measuring an interference power based on a received power in a signal field in which said first pilot signal is transmitted; measuring a desired wave power based on a received power in a signal field in which said second pilot signal is transmitted; and estimating the channel quality of said mobile station based on said interference power and based on said desired wave power.

The present invention for solving the above-mentioned problems is a program suitable for a mobile station in a cellular system, said program executing, executed by an information processor in said mobile station, comprising the steps of: transmitting a pilot signal synchronized with data transmission; and transmitting a pilot signal not synchronized with data transmission.

The present invention for solving the above-mentioned problems is a program suitable for a mobile station in a cellular system, said program, executed by an information processor, comprising steps of: transmitting a first pilot signal in unit transmission time data transmission; and transmitting a second pilot signal, different from said first pilot signal, independently without depending on data transmission.

Effect of the Invention

According to the present invention, the SIR measurement can be carried out in consideration of the influence of data transmission in neighboring cells. That feature can effectively improve the precision of the scheduling or adaptive modulation conducted based on the SIR, thus increasing the throughput of the up-link and decreasing the transmission delay.

EXPLANATION OF SYMBOLS

501, 601 Receive processor
502, 602 Signal separator
503, 603 Channel estimator
504, 607 Demodulator
505, 608 Decoder
506, 610 MAC
507, 612 Pilot signal generator
508, 613 Transmission processor
604 Received power measuring section
605 Interference power measuring section
606 SIR calculator
609 Error decider
611 Control signal generator

BEST MODE FOR CARRYING OUT THE INVENTION

First Embodiment

A first embodiment of the present invention will be explained below.

Figure 3:
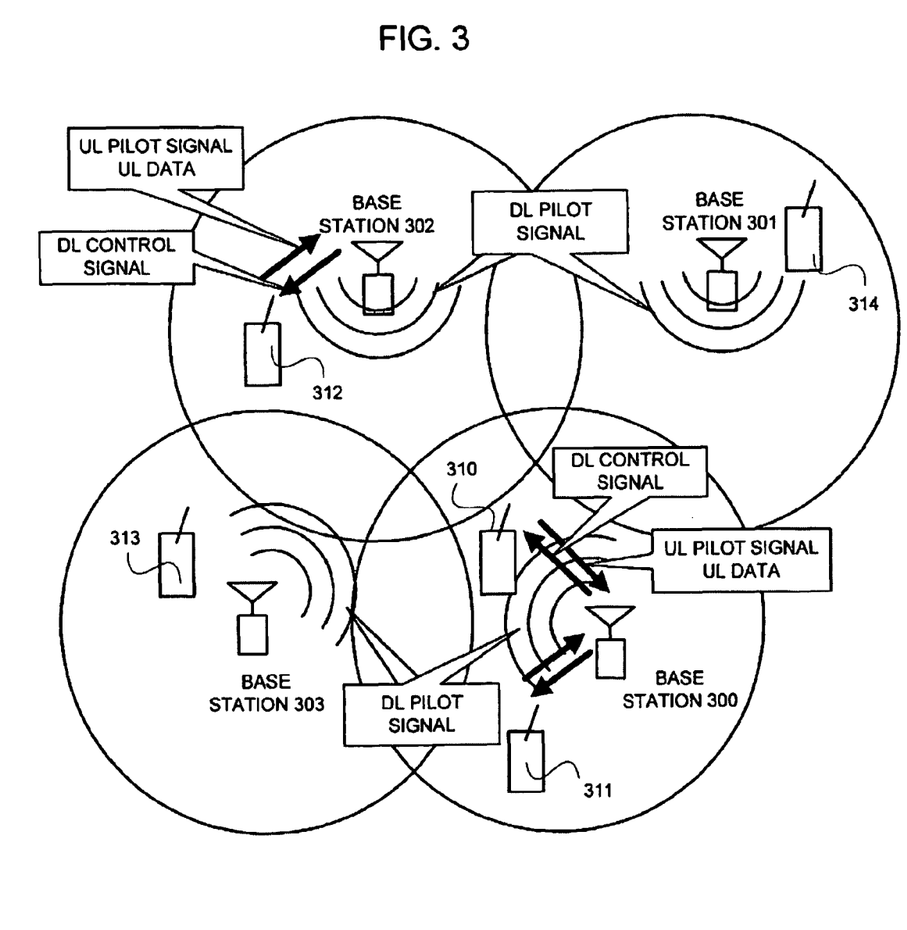
FIG. 3 is a diagram explaining the configuration of a cellular system according to a first embodiment of the present invention.

FIG. 3 is a diagram explaining a system embodying the present invention.

The system comprises base stations 300 to 303 and mobile stations 310 to 314. For example, signals are received using OFDMA in the down-link while signals are transmitted using FDMA in the up-link. Each of the base stations 300 to 303 transmits a shared pilot signal and an individual control signals while each of mobile stations 310 to 314 transmits an individual pilot signals and individual data.

The pilot signal on a down-link is transmitted to all mobile stations within a cell. Each mobile station uses a shared pilot signal to perform channel estimation and to demodulate a control signal on the down-link. The control signal on the down-link contains radio resource allocation information to transmit data via the up-link by a mobile station, ACK/NACK signals for notifying whether or not data transmitted by a mobile station have been received erroneously, or the like.

The up-link transmits pilot signals and data, which are multiplexed in a frame. Moreover, a pilot field synchronized with data transmission and a pilot field not synchronized with data transmission are attached as pilot signal fields.

As described in the related art, the frame timing of a base station in a system is synchronized to some extent. With the timing of the pilot field synchronized with data transmission, a mobile station in a neighboring cell may transmit a pilot for data transmission. The received power in a pilot field synchronized with data transmission contains an interference-by-other cell power equivalent to that in the data field. The interference power can be measured by reflecting the presence or absence of data transmission in the neighboring cell. The base station measures the interference power in the pilot field synchronized with data transmission. The base station also measures a desired wave power of each mobile station in the pilot field not synchronized with data transmission. Thus, SIR of each mobile station is computed. By doing so, SIR can be measured by considering differences in interference level due to the presence or absence of data transmission/reception in neighboring cells. That feature allows the MCS selection or scheduling to be performed more suitably, thus improving the system throughput or user throughput.

An embodiment will be explained below by referring to figures.

Figure 4:
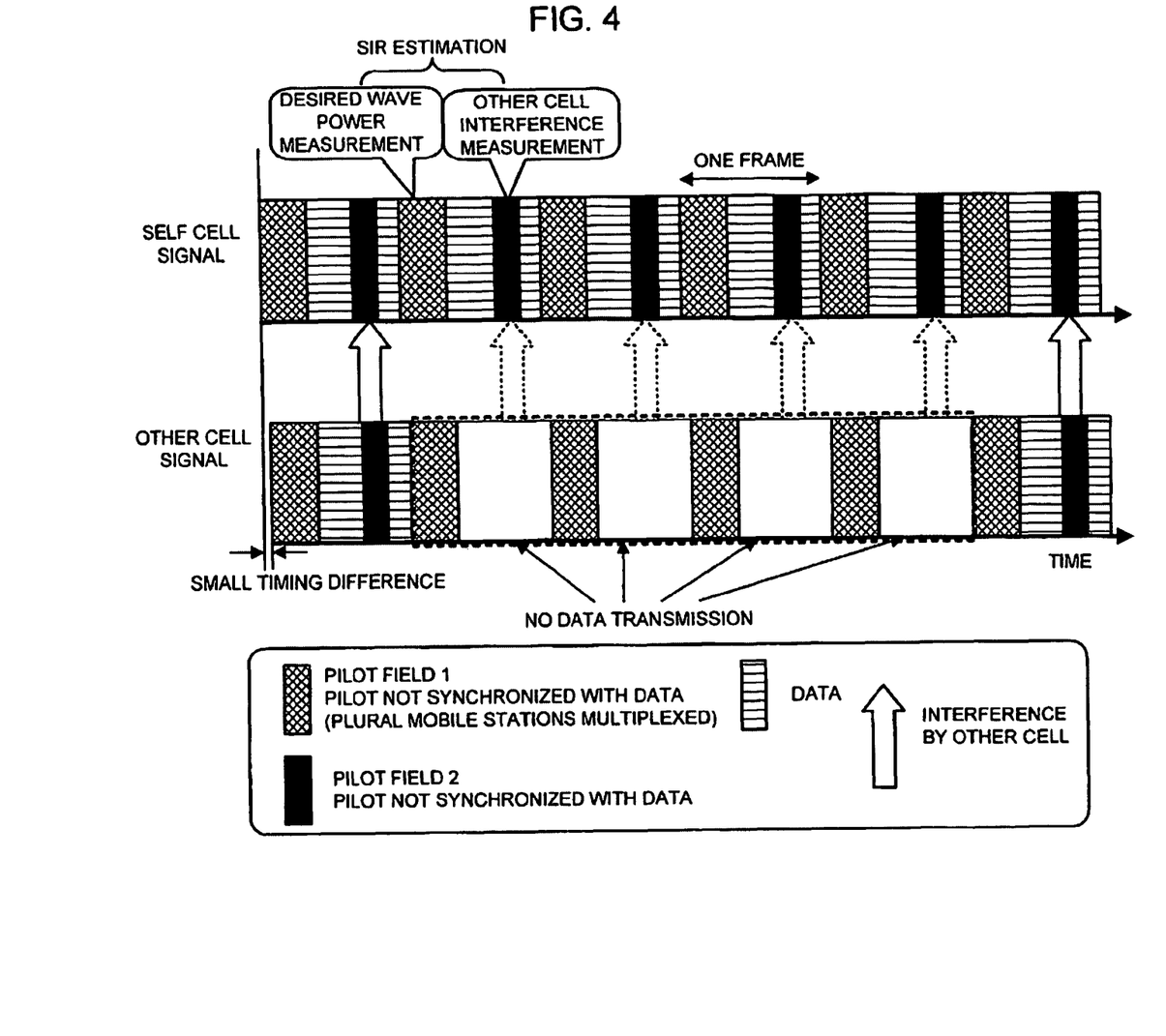
FIG. 4 is a diagram explaining a SIR measuring method according to a first embodiment of the present invention.

FIG. 4 illustrates the frame configuration of an up-link, together with reception under interference by other cell.

Each frame includes two pilot fields. In the first field 1, plural mobile stations transmit pilot signals multiplexed using orthogonal radio resources. In the field 2, a mobile station that transmits data in the corresponding frame transmits a pilot signal.

In order to multiplex pilot signals of plural mobile stations in the pilot field 1, code multiplexing may be performed, for example, by multiplying orthogonal codes different for each mobile station. Moreover, by shifting the frequency band for a pilot transmitted for each mobile station, frequency multiplexing may be performed. In either case, using down-link control signals, a base station or base-station control station notifies each mobile station to allocate different orthogonal codes or frequency bands. Hereinafter, the control signal is referred to as a resource allocation signal in the pilot field 1.

Figure 8:
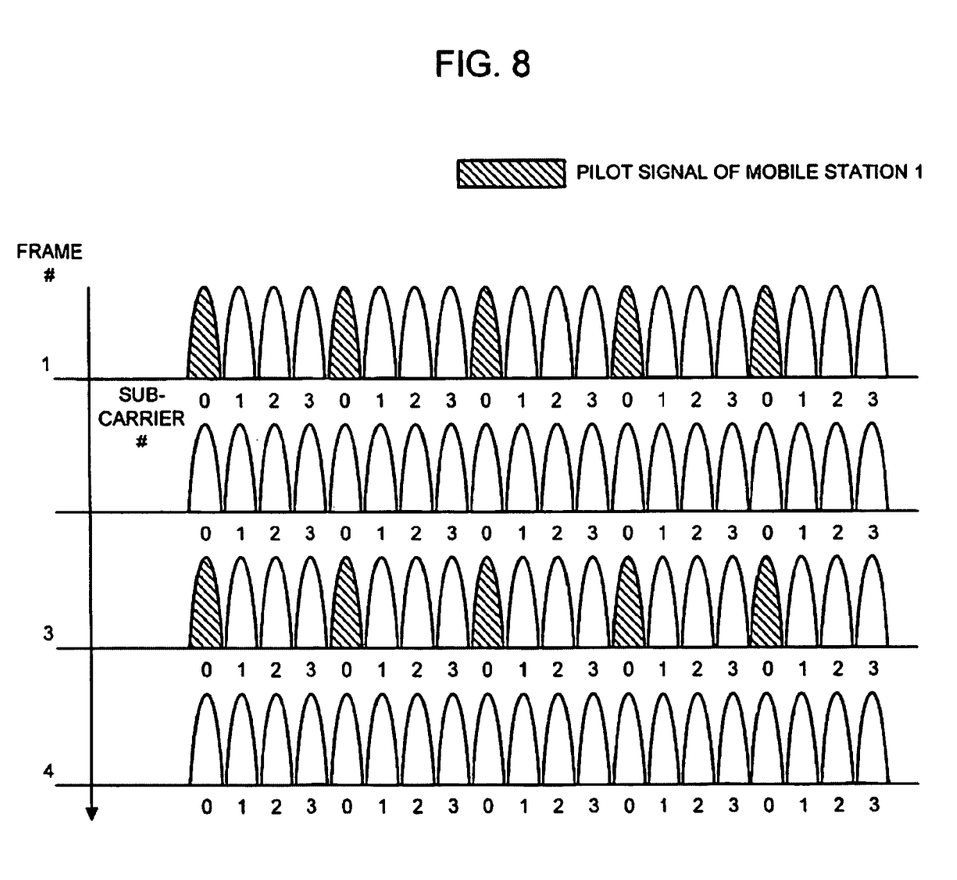
FIG. 8 is a diagram explaining a pilot multiplexing method according to a first embodiment of the present invention.

In the following explanation, it is assumed that the pilot signals of different mobile stations are frequency multiplexed. The resource allocation signal in the pilot field 1 contains the frequency band within the pilot field, in which the corresponding mobile station transmits the pilot signal, and the timing information for transmission. For example, FIG. 8 illustrates the case where the pilot field allocated by the mobile station 1, indicates the transmission start frame number 1, a transmission cycle of two frames and the sub-carrier number 0. Here, the transmission cycle of two frames means that the transmission timing is provided once every two frames.

As to multiplexing in the pilot field 1, it is assumed that Distributed FDMA for distributing signals of respective mobile stations is used over the whole frequency range. A frequency band divided finely for distribution is called "sub-carrier".

In the present embodiment, pilots of plural mobile stations are multiplexed in the pilot field 1 and the pilots of data transmitting users are transmitted to the pilot field 2. Alternatively, pilots of users transmitting data to the pilot field 1 may be multiplexed and pilots of plural mobile stations may be multiplexed in the pilot field 2.

A base station calculates SIR of each mobile station and then selects a scheduling index or a suitable MCS based on the calculated SIR. For SIR calculation, a desired wave signal power of each mobile station is measured in the pilot field 1 and an interference power is measured in the pilot field 2. As to the desired wave power, an average received power P1($t, k$) of pilot signals received in an allocated frequency band is measured with the pilot transmission timing allocated to an objective mobile station (where t represents a sub-carrier number and k represents a mobile station number). The interference power value is obtained by subtracting the desired wave power P2_sgn(t) of a mobile station transmitting a pilot signal in the pilot field 2 from the average value P2_all(t) of all received power of signals received in the pilot field 2 of each frame. That is, SIR(t, k) of the mobile station k is represented by the formula: SIR(t, k)=P1($t, k$)/(P2_all(t)−P2_sgn(t)), where P1 and P2 are represented as truth values.

In the above calculation, it is assumed that a SIR averaged over the whole system band is calculated. However, the scope of the present invention should not be limited only to such assumption. For example, the system band may be divided into plural sub-bands and then SIR may be calculated to each sub-band. In that case, the average power P1, P2 corresponds to the average power of pilot signals received in the corresponding sub-band.

Figure 5:
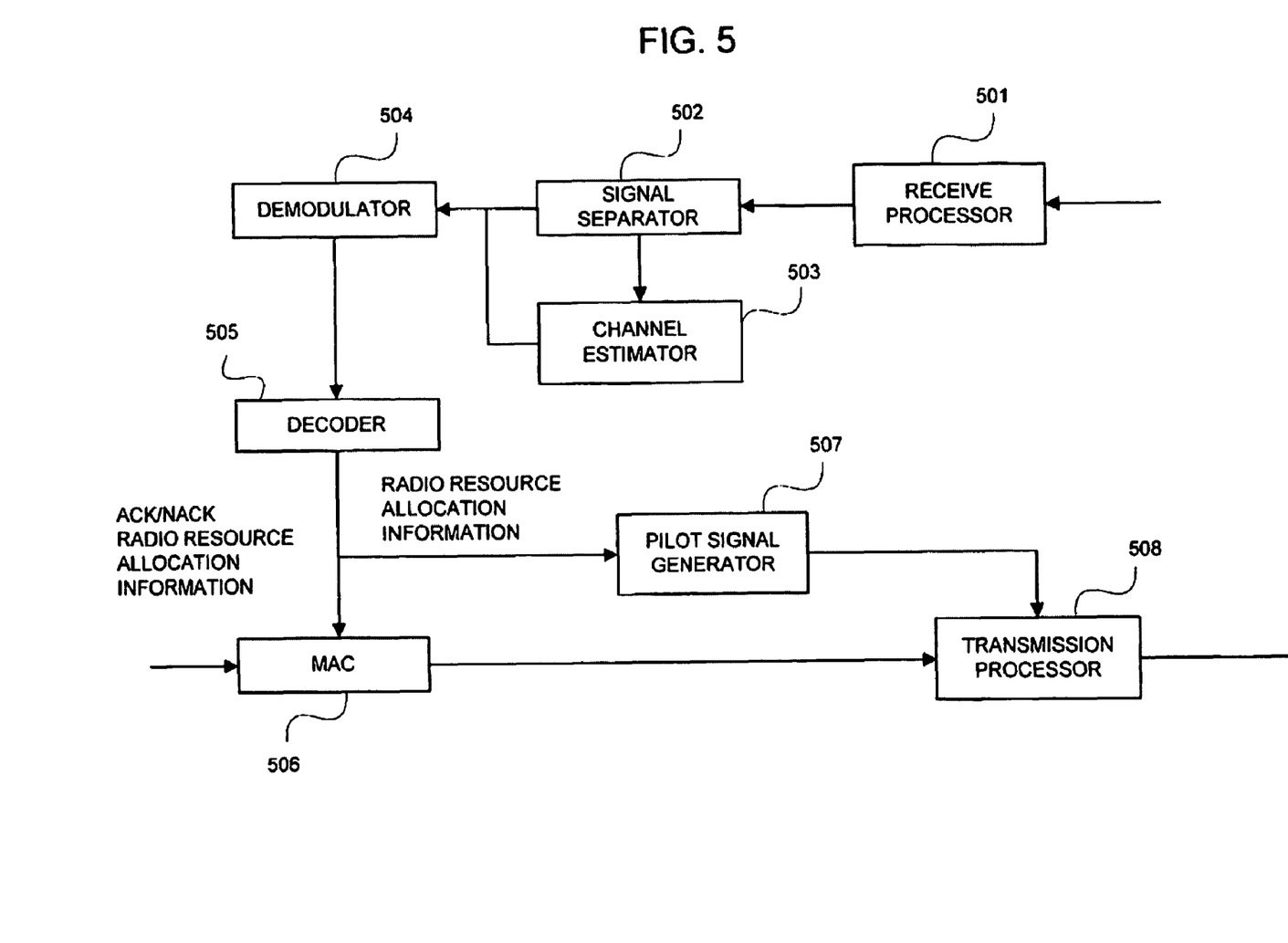
FIG. 5 is a diagram explaining the configuration of a mobile station according to a first embodiment of the present invention.
Figure 6:
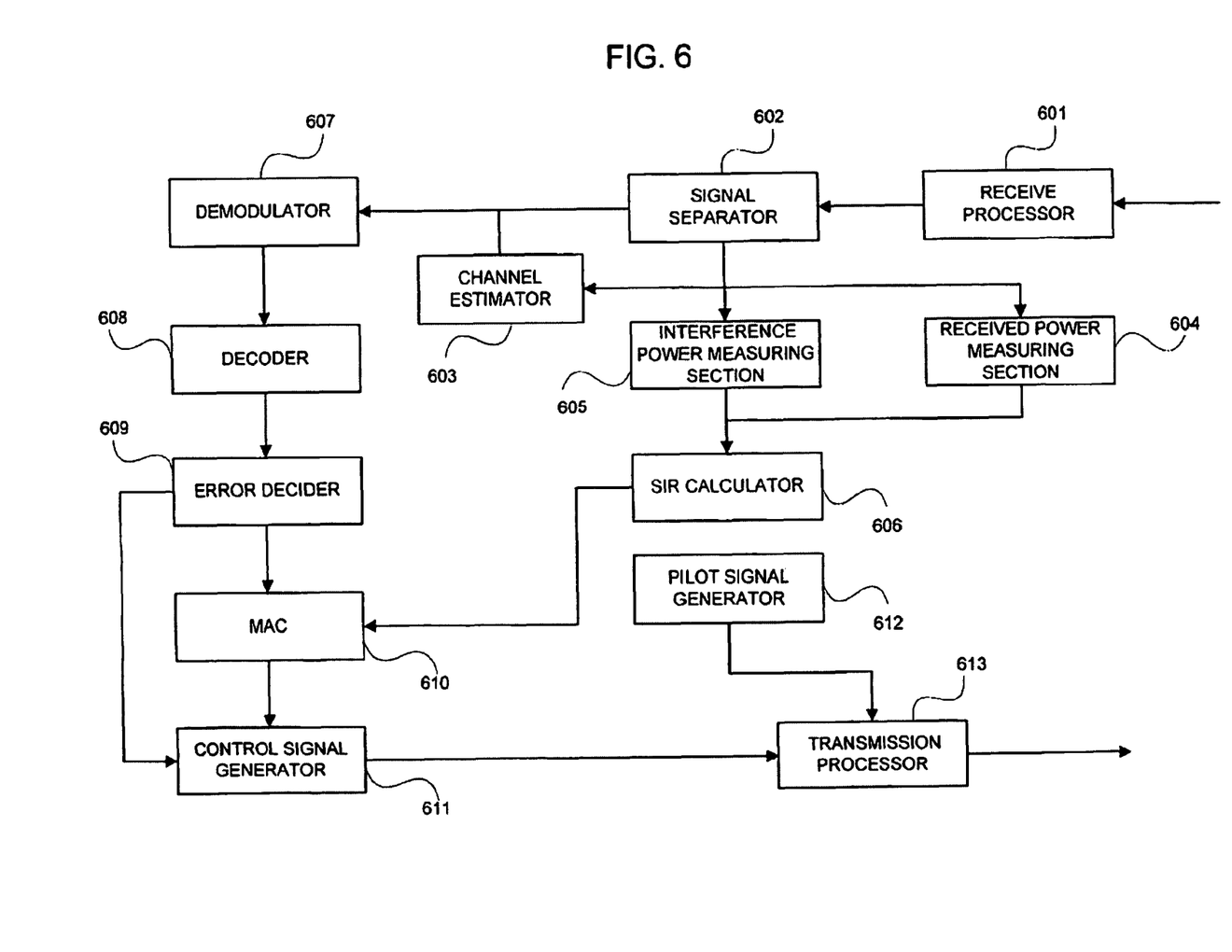
FIG. 6 is a diagram explaining the configuration of a base station according to a first embodiment of the present invention.

FIG. 5 illustrates the configuration of a mobile station applied to the present invention while FIG. 6 illustrates the configuration of a base station applied to the present invention.

<Configuration of Mobile Station>

In the present embodiment, a mobile station consists of a receive processor 501 that receives signals in a predetermined frequency band in frame unit, a signal separator 502 that separates a pilot signal from received signals, a channel estimator 503 that performs channel estimation based on separated pilot signals, a demodulator 504 that performs demodulation based on received signals and a channel estimated value, a decoder 505, a MAC 506, a pilot signal generator 507, and a transmission processor 508.

The MAC 506 stores data transmitted from the upper layer and controls up-link transmission data based on the ACK/NACK signals and the radio resource allocation information, included in the control signal transmitted from the demodulator. Specifically, when a resource is allocated based on the radio resource allocation information, the MAC 506 creates a data block of a transmittable size based on the allocated radio resource and then transmits the data block to the transmission processor 508. Then, when a base station receives data block rightly after a predetermined period of time, the transmission processor 508 receives the ACK signal. When the data block is not received rightly, the transmission processor 508 receives the NACK signal. If the NACK signal is received, the transmission processor 508 re-transmits the data block.

The pilot signal generator 507 creates a pilot signal with the timing specified by the resource allocation information of the pilot field 1 sent from the base station before the start of communication or during communication and then transmits it to the transmission processor 508. Based on the radio resource allocation information sent from the base station during communication, the pilot signal generator 507 creates a pilot signal to be transmitted in the pilot field 2 in the frame for data transmission and then transmits it to the transmission processor 508.

Here, only constituent elements necessary for the present invention are shown and other general constituent elements in a mobile station are omitted.

<Configuration of Base Station>

In the present embodiment, a base station consists of a receive processor 601 that receives signals of a predetermined frequency band in frame unit, a signal separator 602 that separates a pilot signal from received signals, a channel estimator 603 that performs channel estimation based on a separated pilot signal, a desired wave power measuring section 604 that measures a desired wave power, an interference power measuring section 605 that measures an interference power, a SIR calculator 606 that calculates SIR based on a measured desired wave power and based on a measured interference power and then notifies the SIR to the MAC, a demodulator 607, a decoder 608, error decider 609 that detects an error based on CRC attached to a data block, a MAC 610 that performs the scheduling based on, for example, SIR information, a control signal generator 611, a pilot signal generator 612, and a transmission processor 613.

The desired wave power measuring section 604 measures the received power of each of pilot signals of plural mobile stations, multiplexed to the pilot field 1 or 2. The memory (not shown) in the desired wave power measuring section 604 records resource allocation information of the pilot field 1 in each mobile station and respective pilot patterns. Using a conventional method, a pilot power is calculated based on signals and pilot patterns received corresponding to the pilot transmission timing and sub-carrier number of each mobile station. The desired wave power measuring section 604 sends the calculated pilot power to the SIR calculator. The pilot pattern transmitted in the pilot field 2 is shared without depending on any mobile stations. The pilot pattern is stored in the memory. Using a conventional method, the desired wave power measuring section 604 calculates a pilot power based on the received signal of the pilot field 2 and based on the pilot pattern of the pilot field 2. Then, the calculated pilot power is transmitted to the interference power measuring section 605.

The interference power measuring section 605 measures all received power of the pilot field 2 and then subtracts the pilot power value of the pilot field 2 transmitted from the desired wave power measuring section 604 from the measured power to obtain an interference power. The calculated interference power is sent to the SIR calculator 606.

The SIR calculator 606 stores into the memory (not shown) the desired wave power of each mobile station transmitted from the desired wave power measuring section and the interference power transmitted from the interference power measuring section 605. Thus, the SIR calculator 606 sends SIR (obtained by dividing a desired wave power of each mobile station by an interference power) to the MAC 610.

Next, the operation of the present embodiment will be described below.

Figure 7:
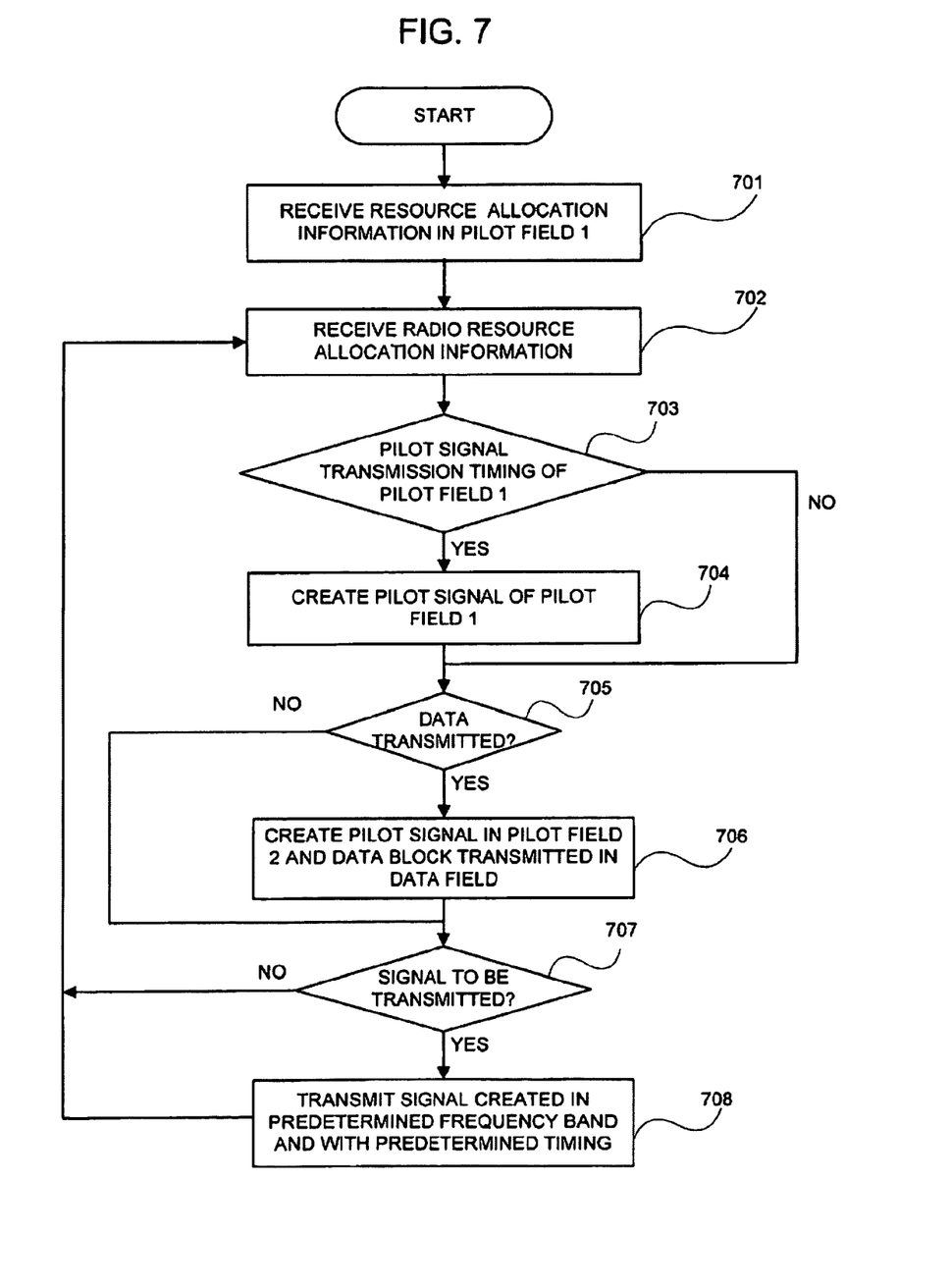
FIG. 7 is a diagram explaining the operational flow of a mobile station according to a first embodiment of the present invention.

FIG. 7 shows the operational flow of a mobile station used in the present invention and FIG. 8 shows the operational flow of a base station used in the present invention.

First, the operation of a mobile station will be explained below.

Prior to data transmission/reception, the decoder 505 in a mobile station decodes the resource allocation signal of the pilot field 1 included in the control signal transmitted from the base station and then transmits the decoded information to the pilot signal generator 507 (step 701).

When the data transmission/reception begins, the decoder 505 decodes a control signal transmitted from the base station every frame and detects an allocation notification of an up-link radio resource, thus sending the notification to the MAC 506 (step 702).

When the corresponding flame is designated as pilot signal transmission timing, with the resource allocation signal of the pilot field 1, the pilot signal generator 507 creates a pilot signal (step 704).

When a resource is allocated by an up-link radio resource allocation notification and up-link data is transmitted with the corresponding frame, the pilot signal generator 507 creates the pilot signal of the pilot field 2 and the MAC 506 creates a data block transmitted by the allocated resource (step 706).

When a signal to be transmitted with the corresponding frame exists, the procedure necessary for transmitting the signal created by the transmission processor 508 is carried out and then transmits the outcome (step 708).

During data transmission/reception, the mobile station repeats the operation in the steps 702 to 708 every frame.

The definition, "during data transmission/reception" should not be limited only the case where data is being transmitted continuously every frame. For example, since a resource is not allocated due to scheduling results, data may not be transmitted or an occurrence of data may be interrupted temporarily. In such cases, it is favorable to repeat continuously the steps 702 to 708. Consequently, when the data transmission/reception on the up-link ends and the operations in the steps 702 to 708 steps, the base station notifies the mobile station about the intention via the down-link. Thus, the mobile station may continue the steps 702 to 708 until the base station receives the notification. Moreover, using an alternative method, the above-mentioned operation may halt. That is, a mobile station periodically monitors the volume of buffer data (not shown) in the MAC buffer data. If there is data for at least a predetermined period of time, the mobile station may notify the base station about a data transmission halt command, using the up control signal. In either case, the present invention is applicable, regardless of the definition "during the data transmission/reception".

Consecutively, the operation of the base station will be described below.

Figure 9:
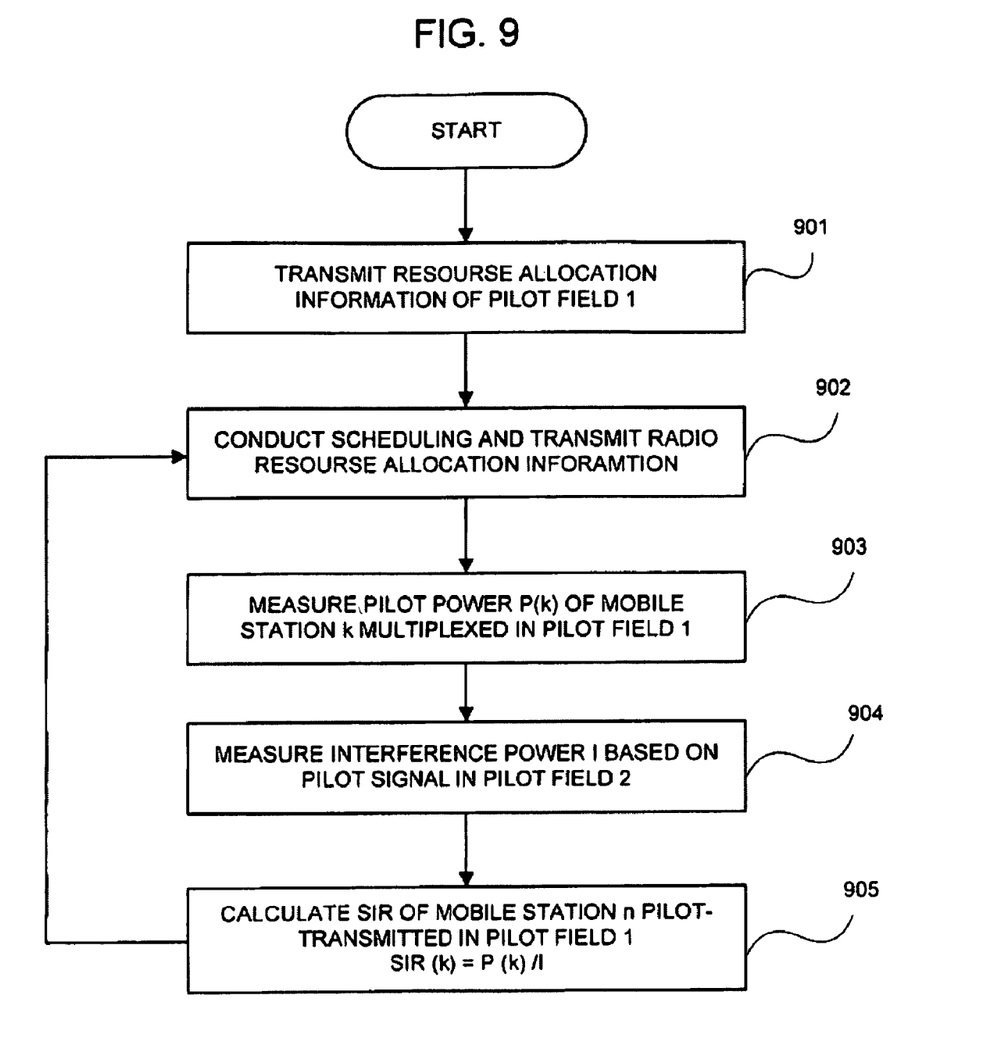
FIG. 9 is a diagram explaining the operational flow of a base station according to a first embodiment of the present invention.

Ahead of data transmission/reception, the controller (not shown) in a base station performs resource allocation of the pilot field 1 to a mobile station starting data transmission/reception and then transmits the resource allocation signal of the pilot field 1, acting as a down-link control signal, to the corresponding mobile station (step 901).

The MAC 610 performs scheduling based on SIR of each mobile station and allocates an up-link radio resource obtained after a predetermined time to the mobile station. Then, the MAC 610 transmits the radio resource allocation signal, acting as a down-link control signal, to the radio resource allocation signal to the mobile station, to which the radio resource has been allocated (step 902).

The received power measuring section 604 measures each of pilot signal received power values of plural mobile stations multiplexed in the pilot field 1. P(k) (k=0, 1, 2, . . . , K) represents the desired wave power of a mobile station (k), where K is the number of mobile stations transmitting data to the base station on the up-link (step 903).

The interference power measuring section 605 calculates an interference power (I) based on the pilot signal multiplexed in the pilot field 2 (step 904). As described above, the interference power value is obtained by subtracting a desired wave power of a mobile station transmitting a pilot signal in the pilot field 2 from all received power in the pilot field 2.

The SIR calculator 606 calculates SIR(k)=P(k)/I based on an interference power (I) and based on the desired wave power P(k) of a mobile station (k) to obtain SIR of the mobile station (k) and then notifies the MAC (step 905) of the SIR.

Thereafter, the operational flow goes back to the step 902. The MAC performs the scheduling based on the SIR notified.

The base station repeats the above-mentioned operations every frame.

Figure 10:
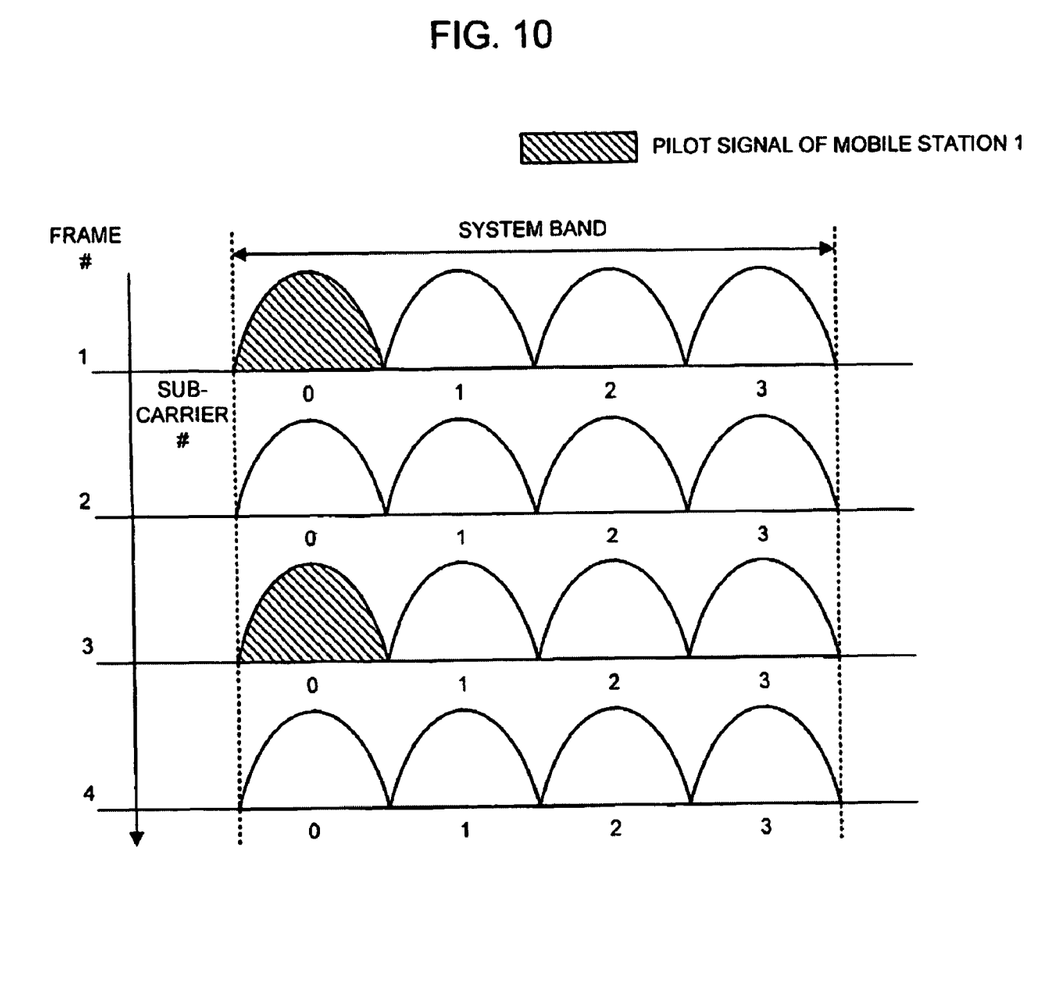
FIG. 10 is a diagram explaining a diagram illustrating another pilot multiplexing method according to a first embodiment of the present invention.

Until now, D-FDMA that disperses the transmission band of a single mobile station within a predetermined band has been used as the method of multiplexing pilot signals from different mobile stations. However, the scope of the present invention should not be limited only to such a method. L-FDMA (Localized-FDMA) may be used that allocates continuous bands to a single mobile station. FIG. 10 illustrates a pilot transmission method employing L-FDMA.

In the present embodiment described above, a base station can measure the interference power with the timing substantially equal to that with which a mobile station transmitting data in the neighboring cell transmits pilots. Moreover, the pilot signal of the mobile station that is not transmitting data does not affect the interference power measurement in the neighboring cell because of the transmission with different timings. For that reason, the base station can measure the interference power in which the presence or absence of data transmission in the neighboring cell is considered. Consequently, SIR calculated based on the interference power has a high correlation to a SIR value in the data field. For that reason, using the SIR measurements for the scheduling allows resource allocation or adaptive modulation to be performed with the value close to SIR at an actual data transmission operation, thus improving user the user multiplex effects or the adaptive modulation precision. That feature allows the throughput of the up-link to be improved and the transmission delay to be decreased.

Second Embodiment

A second embodiment will be described below.

In the first embodiment, the pilot signal synchronized with data transmission and the pilot signal not synchronized with the data transmission are distinguished by time multiplexing them within one frame. However, in the second embodiment, those pilot signals are frequency-multiplexed.

Figure 11:
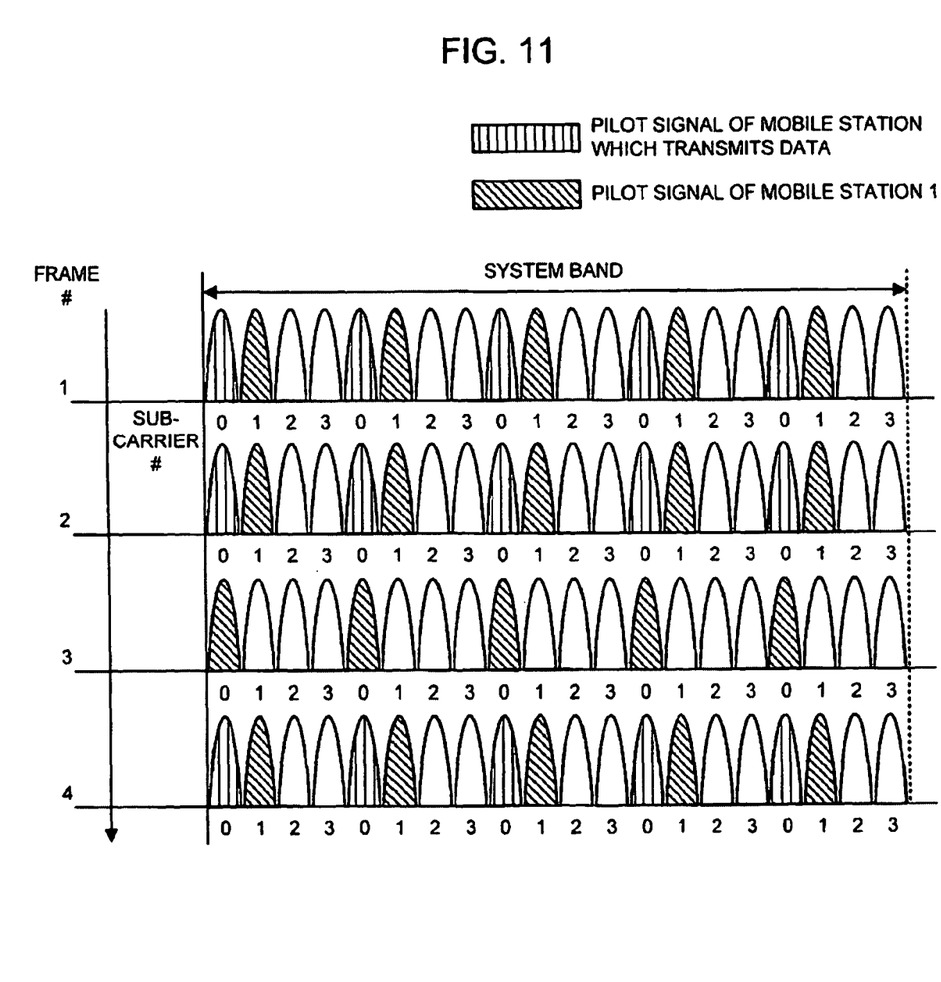
FIG. 11 is a diagram explaining a pilot multiplexing method according to a second embodiment of the present invention.

When D-FDMA, for example, is used as shown in FIG. 11, a specific sub-carrier number, for example, "0", is prescribed to transmit the pilot signal synchronized with data transmission. In the corresponding frame, the mobile station to which a data transmission resource is allocated transmits a pilot signal with the sub-carrier number "0". In an operation similar to that in the first embodiment, other mobile stations transmit pilot signals with the frames and sub-carriers, specified previously by the base station. FIG. 11 illustrates the case where, in the mobile station 1, sub-carrier numbers 1 are allocated in each frame. The case of other mobile stations is not shown. Referring to FIG. 11, data transmission is allocated to the mobile station 1 in the frame 3. The mobile station 1 transmits a pilot signal synchronized with data transmission, with the sub-carrier number 0, and does not transmits the pilot signal with the sub-carrier number 1.

The base station measures the interference power and the received power of a mobile station, which is transmitting data, with a prescribed sub-carrier number, that is, "0" in FIG. 11. The base station also measures the received power of mobile stations, each which is not transmitting data with the pilot signal transmitted with other sub-carrier. SIR of each mobile station is calculated based on the measured interference power and based on the measured received power.

Figure 12:
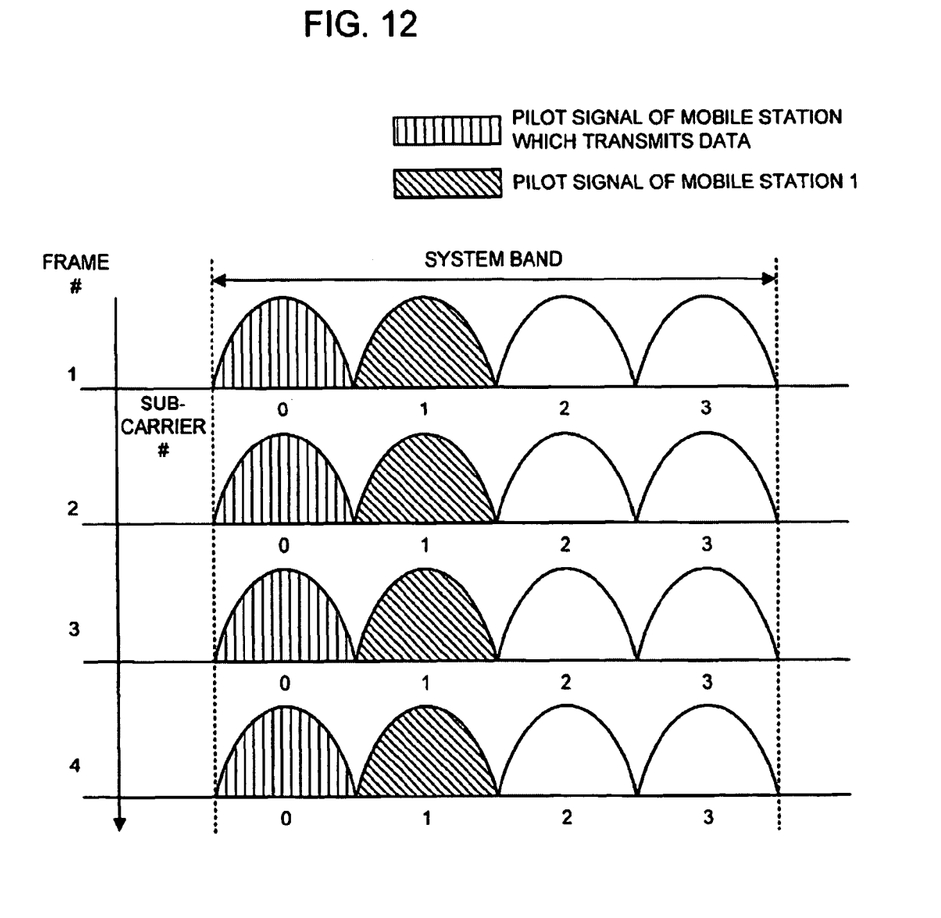
FIG. 12 is a diagram explaining another pilot multiplexing method according to a second embodiment of the present invention.

Here, D-FDMA dispersing the transmission band of one mobile station within a predetermined band has been used as the method of multiplexing pilot signals from different mobile stations. However, the scope of the present invention should not be limited only to the above embodiment. Alternatively, L-FDMA (Localized-FDMA) that allocates continuous bands to a single mobile station may be used. FIG. 12 depicts a pilot transmission method employing L-FDMA.

The second embodiment is equivalent to the first embodiment but the pilot field 2 is multiplexed to the pilot field 1. The configuration of the base station or each mobile station and the operation flow thereof are in common and hence the duplicate explanation will be omitted here.

As described above and in a manner similar to the first embodiment, a base station can measure an interference power with the same timing substantially as that with which a data transmitting mobile station transmits pilots. Moreover, since the mobile stations, not transmitting data, transmit pilot signals with different timings, the mobile station does not influence the interference power measurement in a neighboring cell. Consequently, the base station can measure the interference power in which the presence or absence of data transmission in the neighboring cell is considered. SIR worked out based on the interference power has a high correlation to the SIR value in the data field. For that reason, by using the SIR measurements for scheduling allows the resource allocation or adaptive modulation to be performed at a value closer to SIR at an actual data transmission time, thus improving the user multiplex effect and the adaptive modulation precision. As a result, that feature can lead to improving the throughput of an up-link and decreasing the transmission delay.

According to the present invention described above, the base station can measure the interference power in which the presence or absence of data transmission in neighboring cells is counted. SIR calculated based on the interference power has a high correlation to the SIR value in the data field. For that reason, by using the SIR measurement result for the scheduling, the resource allocation or adaptive modulation can be performed at a value closer to SIR at an actual data transmission time, so that the user multiplex effect and the adaptive modulation precision are improved. Consequently, that feature allows the throughput of an up-link to be improved and the transmission delay to be decreased.

In the embodiments described above, respective elements are configured in hardware. However, the present invention should not be limited only to such a hardware configuration. Alternatively, respective elements may be configured of an information processor that operates with programs.

The present application claims the priority based on Japanese Patent Application No. 2006-327811 filed on Dec. 5, 2006 and the entire of the disclosure is incorporated here.

The invention claimed is:

1. A cellular system comprising:
a mobile station, said mobile station including transmitter that generates and transmits both a pilot signal synchronized with data transmission and a pilot signal not synchronized with data transmission; and
a base station, said base station including measuring unit that measures an interference power based on a received power in a pilot signal field synchronized with said data transmission, measuring unit that measures a desired wave power based on a received power in a pilot signal field not synchronized with said data transmission, and estimator that estimates SIR (signal to interference ratio) of said mobile station based on said interference power and based on said desired wave power.

2. The cellular system defined in claim 1, wherein both said pilot signal synchronized with data transmission and said pilot signal not synchronized said data transmission are time-multiplexed within an unit transmission time.

3. The cellular system defined in claim 1, wherein both said pilot signal synchronized with data transmission and said pilot signal not synchronized with data transmission are frequency-multiplexed within an unit transmission time.

4. The cellular system defined in claim 1, wherein said interference power is obtained by subtracting a received power of said pilot signal synchronized with data transmission from a total received power in the signal field of said pilot signal synchronized with data transmission.

5. A cellular system comprising:
a mobile station, said mobile station including transmitter that generates and transmits a first pilot signal in an unit transmission time for data transmission and a second pilot signal, different from said first pilot signal, independently without depending on data transmission; and
a base station, said base station including measuring unit that measures an interference power based on a received power in a signal field, in which said first pilot signal is transmitted, measuring unit that measures a desired wave power based on a received power in a signal field, in which said second pilot signal is transmitted, and estimator that measures SIR (signal to interference ratio) of said mobile station based on said interference power and based on said desired wave power.

6. The cellular system defined in claim 5, wherein both said pilot signal synchronized with data transmission and said pilot signal not synchronized said data transmission are time-multiplexed within an unit transmission time.

7. The cellular system defined in claim 5, wherein both said pilot signal synchronized with data transmission and said pilot signal not synchronized with data transmission are frequency-multiplexed within an unit transmission time.

8. The cellular system defined in claim 5, wherein said interference power is obtained by subtracting a received power of said pilot signal synchronized with data transmission from a total received power in the signal field of said pilot signal synchronized with data transmission.

9. A method for measuring a communication path quality in a cellular system including plural base stations and plural mobile stations, each of said mobile stations executing the steps of transmitting a pilot signal synchronized with data transmission and transmitting a pilot signal not synchronized with data transmission; and each of said base stations executing the steps of measuring an interference power based on a received power of a pilot signal field synchronized with said data transmission, measuring a desired wave power based on a received power of a pilot signal field not synchronized with said data transmission and estimating SIR (signal to interference ratio) of each mobile station based on said interference power and based on said desired wave power.

10. A method of measuring a communication path quality in a cellular system including plural base stations and said mobile stations, each of said mobile stations executing the steps of transmitting a first pilot signal in a unit transmission time for data transmission and transmitting a second pilot signal, different from said first pilot signal, independently without depending on data transmission, each of said base stations executing the steps of measuring an interference power based on a received power in a signal field in which said first pilot signal is transmitted, measuring a desired wave power based on a received power in a signal field in which said second pilot signal is transmitted, and estimating SIR (signal to interference ratio) of said mobile station based on said interference power and based on said desired wave power.

11. A base station in a cellular system, said cellular system including a mobile station, said mobile station including transmitter for transmitting a pilot signal synchronized with data transmission and transmitter for transmitting a pilot signal not synchronized with data transmission, said base station comprising:
measuring unit that measures an interference power based on a received power in a pilot signal field synchronized with said data transmission;
measuring unit that measures a desired wave power based on a received power in a pilot signal field not synchronized with said data transmission; and
estimator that estimates SIR (signal to interference ratio) of said mobile station based on said interference power and based on said desired wave power.

12. A base station in a cellular system, said cellular system including a mobile station, said mobile station including transmitter for transmitting a first pilot signal in a unit transmission time for data transmission and transmitter for transmitting a second pilot signal, different from said first pilot signal, independently without depending on data transmission, said base station comprising:
measuring unit that measures an interference power based on a received power in a transmission field in which said first pilot signal is transmitted;
measuring unit that measures a desired wave power based on a received power in a signal field in which said second pilot signal is transmitted; and estimator that estimates SIR (signal to interference ratio) of said mobile station based on said interference power and based on said desired wave power.

13. A non-transitory computer readable recording medium storing a program for a base station in a cellular system, said cellular system including a mobile station having transmitter for transmitting a pilot signal synchronized with data transmission and transmitter for transmitting a pilot signal not synchronized with data transmission, said program, executed by an information processor in said base station, comprising the steps of:
   measuring an interference power based on a received power in a pilot signal synchronized with said data transmission;
   measuring a desired wave power based on a received power in a pilot signal field not synchronized with said data transmission; and
   estimating SIR (signal to interference ratio) of said mobile station based on said interference power and based on said desired wave power.

14. A non-transitory computer readable recording medium storing a program suitable for a base station in a cellular system, said cellular system including a mobile station, said mobile station including transmitter for transmitting a first pilot signal in a unit transmission time for data transmission and transmitter for transmitting a second pilot signal, different from said first pilot signal, independently without depending on data transmission, said program executed by an information processor in said base station, comprising the steps of:
   measuring an interference power based on a received power in a signal field in which said first pilot signal is transmitted;
   measuring a desired wave power based on a received power in a signal field in which said second pilot signal is transmitted; and
   estimating SIR (signal to interference ratio) of said mobile station based on said interference power and based on said desired wave power.

* * * * *